(12) United States Patent
Mehta et al.

(10) Patent No.: US 11,310,116 B2
(45) Date of Patent: *Apr. 19, 2022

(54) SCALING OF REMOTE NETWORK DIRECTORY MANAGEMENT RESOURCES

(71) Applicant: Amazon Technologies, Inc., Seattle, WA (US)

(72) Inventors: Gaurang Pankaj Mehta, Seattle, WA (US); Shon Kiran Shah, Redmond, WA (US); Sameer Palande, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/512,170

(22) Filed: Jul. 15, 2019

(65) Prior Publication Data

US 2020/0028752 A1 Jan. 23, 2020

Related U.S. Application Data

(63) Continuation of application No. 14/499,879, filed on Sep. 29, 2014, now Pat. No. 10,355,942.

(51) Int. Cl.
*G06F 15/173* (2006.01)
*H04L 41/14* (2022.01)
(Continued)

(52) U.S. Cl.
CPC .............. *H04L 41/14* (2013.01); *G06Q 10/00* (2013.01); *H04L 41/0816* (2013.01);
(Continued)

(58) Field of Classification Search
CPC . H04L 41/14; H04L 41/0816; H04L 41/0886; H04L 41/0893; H04L 43/08; H04L 47/70; H04L 43/0876; G06Q 10/00
(Continued)

(56) References Cited

U.S. PATENT DOCUMENTS 6,233,616 B1 5/2001 Reid
8,055,691 B2* 11/2011 Delgaudio ............. G06Q 10/10
707/829

(Continued)

OTHER PUBLICATIONS

Abdul-Rahman et al., Live Migration-based Resource Managers for Virtualized Environments: A Survey, Cloud Computing 2010—The First International Conference on Cloud Computing, GRIDS and Virtualization, IARIA, 2010, p. 32-40 (Year: 2010).*

(Continued)

*Primary Examiner* — Taylor A Elfervig
(74) *Attorney, Agent, or Firm* — Knobbe, Martens, Olson & Bear, LLP (57) ABSTRACT

Features are disclosed for facilitating remote management of network directories of organizations by a directory management system. The network directories may change over time, experiencing growth in size and number of current connections, increased latency, reduced performance, and the like. The network directories may also shrink over time, experience fewer connections, etc. Organizations can define scaling policies by which the directory management system can automatically respond to the occurrence of various events, such as changes in the size or usage of the organizations' network directories, by scaling resources associated with the directories. The directory management system can perform various scaling actions on-demand or without requiring additional action by the organizations, thereby reducing the time and effort required by the organizations to monitor their own directories and implement (or request implementation of) changes.

14 Claims, 6 Drawing Sheets

(51) Int. Cl.
| | |
|---|---|
| *H04L 43/08* | (2022.01) |
| *H04L 47/70* | (2022.01) |
| *G06Q 10/00* | (2012.01) |
| *H04L 41/0816* | (2022.01) |
| *H04L 41/08* | (2022.01) |
| *H04L 41/0893* | (2022.01) |
| *H04L 43/0876* | (2022.01) |

(52) U.S. Cl.
CPC ...... *H04L 41/0886* (2013.01); *H04L 41/0893* (2013.01); *H04L 43/08* (2013.01); *H04L 47/70* (2013.01); *H04L 43/0876* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 8,260,840 | B1* | 9/2012 | Sirota | G06F 9/5061 709/201 |
| 8,285,817 | B1* | 10/2012 | Balasubramanian | G06F 16/119 709/219 |
| 9,317,404 | B1* | 4/2016 | Cohen | G06F 11/368 |
| 9,596,189 | B1* | 3/2017 | Lea | G06F 16/214 |
| 2002/0138572 | A1 | 9/2002 | Delany et al. | |
| 2004/0073668 | A1 | 4/2004 | Bhat et al. | |
| 2006/0041755 | A1* | 2/2006 | Pemmaraju | H04L 63/083 713/182 |
| 2007/0174905 | A1 | 7/2007 | Martherus et al. | |
| 2010/0262632 | A1 | 10/2010 | Jain et al. | |
| 2010/0268764 | A1* | 10/2010 | Wee | H04L 67/1002 709/203 |
| 2010/0313063 | A1* | 12/2010 | Venkataraja | G06F 9/5072 714/4.1 |
| 2011/0314520 | A1 | 12/2011 | Olszewksi et al. | |
| 2012/0106540 | A1 | 5/2012 | Moyers et al. | |
| 2012/0254443 | A1* | 10/2012 | Ueda | G06F 9/5083 709/226 |
| 2013/0054776 | A1* | 2/2013 | Kunze | G06F 9/5061 709/224 |
| 2013/0254384 | A1* | 9/2013 | Wray | G06F 11/3409 709/224 |
| 2014/0149590 | A1* | 5/2014 | Mallipeddi | G06F 9/5088 709/226 |
| 2014/0343989 | A1 | 11/2014 | Martini et al. | |
| 2015/0088586 | A1* | 3/2015 | Pavlas | G06F 9/45558 705/7.25 |
| 2015/0220559 | A1* | 8/2015 | Sudheer | G06F 16/122 707/704 |
| 2015/0373038 | A1* | 12/2015 | Blackwell | G06F 21/554 726/23 |
| 2016/0014159 | A1 | 1/2016 | Schrecker et al. | |
| 2017/0250870 | A1* | 8/2017 | Zhao | H04L 63/20 |

OTHER PUBLICATIONS

H. N. Van, F. D. Tran and J. Menaud, "SLA-Aware Virtual Resource Management for Cloud Infrastructures," 2009 Ninth IEEE International Conference on Computerand Information Technology, 2009, pp. 357-362, (Year: 2009).*

J. Rolia, L. Cherkasova and C. McCarthy, "Configuring Workload Manager Control Parameters for Resource Pools," 2006 IEEE/IFIP Network Operations and Management Symposium NOMS 2006, 2006, pp. 127-137 (Year: 2006).*

H. Nguyen Van, F. Dang Tran and J.-M. Menaud, "Autonomic virtual resource management for service hosting platforms," 2009 ICSE Workshop on Software Engineering Challenges of Cloud Computing, 2009, pp. 1-8 (Year: 2009).*

Wang et al., Estimating The Performance Ofhypothetical Cloud Service Deployments: Ameasurementbased Approach, Proceedings IEEE Infocom, pp. 2372-2380, 2011.

Li et al., A Scalable Location Service For Geographic Ad Hoc Routing, In Proceedings of the 6th annual international conference on Mobile computing and networking(MobiCom '00), pp. 120-130, 2000.

Huang et al., Measuring and Evaluating Large-Scale CDNS (Paper Withdrawn), IMC '08, pp. 15-29, 2008.

* cited by examiner

SCALING OF REMOTE NETWORK DIRECTORY MANAGEMENT RESOURCES

CROSS-REFERENCE TO RELATED APPLICATION

This application is a continuation of U.S. application Ser. No. 14/499,879, filed Sep. 29, 2014 and titled "SCALING OF REMOTE NETWORK DIRECTORY MANAGEMENT RESOURCES," the contents of which are incorporated by reference herein.

BACKGROUND

Organizations, such as companies and other enterprises, often network their computing devices to communicate with each other and with computing devices outside of the organization. Network directories, also referred to simply as "directories," are specialized collections of information about devices, applications, people and other common objects of computer networks. Organizations with computing networks typically use directories to efficiently locate, organize, administer and otherwise manage the network resources. For example, a user may be added to a directory and associated with particular credentials. Thereafter, the user may be authenticated by comparing user-supplied credentials (e.g., obtained during a login procedure) to those in the directory. Information about what the user is authorized to do may then be retrieved from the directory. As another example, individual computers, printers and other devices that are part of a network environment may be listed in a directory, and applications or users may look up a list of available devices in the directory and obtain information for accessing them (e.g., names, addresses, etc.).

Organizations often utilize directory management services to create and maintain their directories. A directory management service may be configured to create a directory in a data center operated by the organization (e.g., on-premises) or in a remote network (e.g., off-premises), depending on the organization's business needs. The number of objects in the directory, the number of concurrent connections to the directory, and other factors that affect directory may change over time. For example, if an organization adds new employees, the directory management service may create objects in the directory for each of the new employees and each device used by the new employees. Additional connections may also be established with the directory while the new employees are using their devices.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure involves an architecture in which a directory management system that is separate from enterprises and other organizational customers (e.g., a cloud-based or other remote directory service) can manage the organizations' network directories from off of the organizations' premises. The remote directory management system can be configured by the organizations to automatically scale the organizations' directories and/or the resources used to manage the directories in response to the satisfaction of various criteria or otherwise based on the occurrence of various events. The remote directory management system may also or alternatively scale the organizations' directories and/or the resources used to manage the directories on-demand, at the discretion of the organizations.

Some remote directory management services maintain directories of customer organizations in a network environment that includes multiple (e.g., two or more) data centers located throughout a range of geographic regions. A remote directory management service may implement, for a particular organization, a domain controller (or some other system that responds to security authentication requests, authorization requests, and the like) in each of two or more different data centers within a region to improve or maximize availability and performance of the organization's directory within the region. Over time, an organization's directory needs may change. For example, as the organization adds employees, additional objects may be defined within the directory for each new employee, for each new device used by the employees, etc. Additional connections to the directory may also be established due to the new employees. As new objects are defined within the directory and additional connections are established, the overall performance of the directory may be negatively affected, particularly when the computing system on which the directory is stored or managed (e.g., the domain controller) does not have sufficient resources to satisfy the demands of the growing directory. In addition, customers may remove objects from directories and/or reduce the number of concurrent connections to the directory. For example, when a remote directory management service charges a fee to customer organizations based on the size of the directory under management or the number of connections to the directory, organizations may desire to scale down their directories in order to save fees, free up resources, etc. Organizations may make adjustments to their directories and/or the resources used to manage the directories in order to maintain or improve directory performance (e.g., using domain controllers with additional resources sufficient to satisfy the demands of a growing directory), or to maintain or reduce costs and excess capacity (e.g., using domain controllers with fewer resources that are nevertheless sufficient to satisfy the current and/or expected demands of the directory).

Aspects of the present disclosure relate to automatic and on-demand scaling of directories, including changing the computing resources responsible for managing the directories (e.g., the domain controllers) to increase or reduce the available size of the directories. The directories may be scaled by migrating to domain controllers with additional computing resources sufficient to handle a current or expected size of a directory, number of connections to the directory, etc. Such scaling may be referred to as "vertical scaling." A remote directory management service can automatically, or at the discretion of the organizations, scale the directories for the organizations, thereby reducing the tasks that organizations must typically perform to scale their respective directories (e.g., acquiring new hardware; configuring the operating system and network domain; setting up directory replication; etc.). In some embodiments, the automatic scaling can be triggered by the satisfaction of one or more criteria or otherwise by the occurrence of one or more events, as monitored by the remote directory management service. For example, the remote directory management service can monitor the number of objects in an organization's directory and/or the number of connections to the directory. Based on a policy defined or selected by the organization, the remote directory management service can automatically migrate management of the organization's directory to a different domain controller with additional resources to handle an increase in objects/connections, or to a domain controller with fewer resources in order to save costs. In addition to the migration, the remote directory service can configure replication and perform any other necessary procedures automatically, without additional input or action on the part of the organization subsequent to the initial specification of the scaling policy.

Additional aspects of the present disclosure relate to the automatic or on-demand addition of domain controllers, regions, and the like to increase the computing resources managing a directory and/or to increase the size of the geographic region (or the number of individual geographic regions) in which a directory may be used. Such scaling may be referred to as "horizontal scaling," and differs from the vertical scaling described above in that the computing resources managing the directory are not necessarily scaled to increase or decrease the number of directory objects that can be effectively managed, but rather to increase or decrease the overall availability of the directory. For example, a remote directory management service may maintain directories of customer organizations in a network environment that includes multiple (e.g., two or more) data centers in each of multiple geographic regions. The total geographic area serviced by the remote directory management service may be separated into separate regions in order to improve latency and performance within each region (e.g., by limiting the scope of the directories under management to a single region). In order to further improve performance within a specific region, additional domain controllers may be added for the directory to efficiently support a larger number of concurrent connections. Thus, the connections can be spread among more domain controllers, thereby decreasing user-perceived latency and improving user-perceived performance. As another example, an organization may be a global organization or some other organization that spans multiple geographic regions into which management of directories is usually segmented. By adding additional geographic regions to the area that corresponds to a particular directory, the directory can be shared across the multiple geographic regions, effectively increasing the total geographic area covered by a single directory. As with vertical scaling, horizontal scaling may include the reduction of resources (e.g., removal of domain controllers and/or regions) in addition to or instead of the addition of resources.

Moreover, horizontal scaling can be automatically triggered based on the satisfaction of organization-specified criteria or the occurrence of some other event, and the remote directory management service can automatically configure domain controllers, set up replication, and perform other necessary procedures automatically, without additional input or action on the part of the organization.

Although aspects of the embodiments described in the disclosure will focus, for the purpose of illustration, on specific examples and embodiments of directories, domain controllers, remote directory management services and service area hierarchies, one skilled in the art will appreciate that the examples and techniques disclosed herein are illustrative only and may be applied to any number of services, process, or applications. Various aspects of the disclosure will now be described with regard to certain examples and embodiments, which are intended to illustrate but not limit the disclosure.

Example Directory Management Environment

Figure 1:
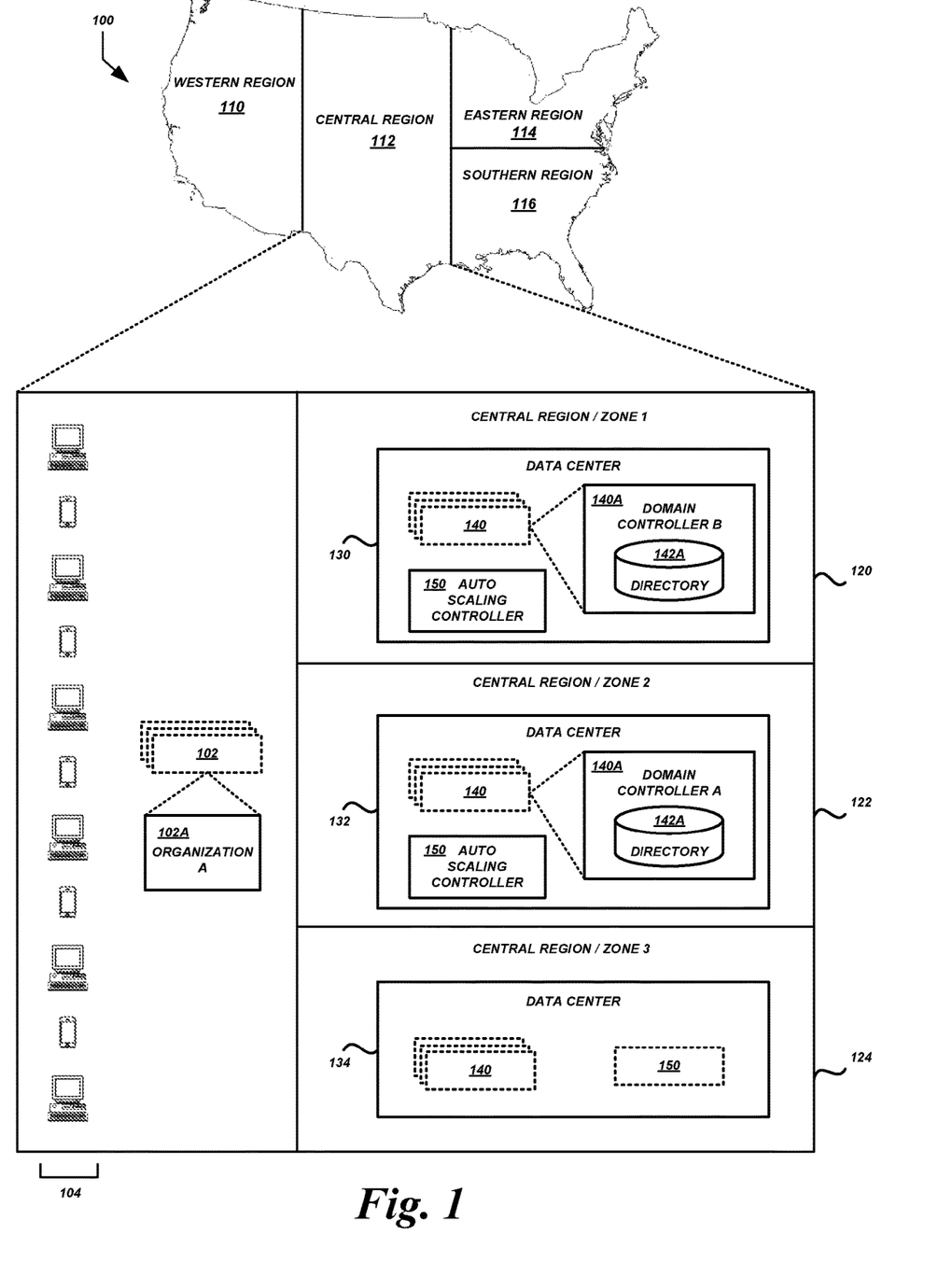
FIG. 1 is a block diagram of an illustrative network environment including various regions in which a directory management system may maintain directories for customer organizations.

FIG. 1 shows an example environment in which directory management features of the present disclosure can be implemented according to some embodiments. As used herein the term "directory" generally refers to an organized collection of data about users, devices, applications, and/or other common resources of a computer network, such as a corporate network, university network, or some other network. Each resource on a computer network (or some subset thereof) may be represented as an object in a directory, and information about a particular resource (e.g., name, address, permissions, etc.) can be stored as attributes of that object. Information can be securely stored within or in association with the object such that only users with sufficient permissions are able to access, modify, or otherwise use the information. As used herein, the term "domain controller" refers to a server or other computing device or virtual machine (or group of computing devices and/or virtual machines) that responds to security authentication requests (e.g., user logins), authorization requests (e.g., checking user permissions to perform some task), and the like using a particular network directory.

A directory management system may maintain directories of customer organizations in a network environment that includes data centers located throughout a geographic area. As shown, a geographic area 100, such as the continental United States, serviced by a directory management system may be divided into various regions 110, 112, 114 and 116. Individual regions, such as region 112, may be further divided into various zones 120, 122, 124, and so on. Although particular geographic regions and zones will be described, such regions and zones are illustrative only, and are not intended to be limiting. In some embodiments, other regions, zones and the like may be used, or other divisions of service areas altogether may be used. The directory management system may implement, for any particular organization, a domain controller in each of two or more different data centers within a region to improve or maximize availability and performance of the organization's directory within the region. In addition, the directory management system can automatically scale the organization's directory and/or the resources used to manage the directory in order to improve availability and/or user-perceived performance, reduce fees and/or excess computing resources, and the like as described in greater detail below.

The organizations 102 can correspond to various customers of the directory management system. Although the term "organization" is used herein, the features involving such organizations may additionally or alternatively involve any customer or entity having a directory and wishing to use the directory management system to manage access to the directory by, e.g., user computing devices 104 of users associated with the organization. For example, an organization 102A may employ the services of the directory management system, which may store the organization's directory 142A in one or more data centers within the region in which the organization 102A is located, or in which the directory 142A is to be used. Users associated with the organization 102A (e.g., users with corresponding user information in the directory 142A) may use computing devices 104 that connect to the directory management system in order to access the directory 142A for authentication, authorization, and the like.

The user computing devices 104 can correspond to a wide variety of computing devices, including desktop computing devices, laptop computing devices, terminal devices, mobile phones, tablet computing devices, media players, wearable computing devices (e.g., smart watches, smart eyewear, etc.), and various other electronic computing devices and appliances having one or more computer processors, computer-readable memory and network-access capabilities. Some user computing devices 104 may be associated with a particular organization 102A. For example, an organization may have various user computing devices 104 that remain on-premises, or that are used off-premises primarily by employees or other users associated with the organization. In some embodiments, some or all of the user computing devices 104 may be separate from any organization, such as public computers or home computers that are used by any number of users to perform various tasks, which may include accessing applications using credentials associated with a particular organization 102A.

The directory management system may have data centers spread across each region to manage directories and provide other computing services within the respective regions. For example, the directory management system may have one or more data centers in each zone, such data centers 130, 132 and 134 in zones 120, 122 and 124, respectively, of region 112. The data centers 130, 132 and 134 may each house many computing devices (e.g., hundreds or thousands) configured to host or otherwise provide access to applications, manage directories for separate customer organizations, and/or provide other network-based services and resources. Each domain controller 140 may be a single computing device, or it may include multiple distinct computing devices, such as computer servers, logically or physically grouped together to collectively operate as a server system. For example, a data center 132 many include a server or group of servers that that operate as one or more domain controllers 140 for organizations' directories, including a particular domain controller 140A that manages the directory 142A of organization 102A. To improve or maximize uptime and availability within the region 112, a second domain controller 140B can be implemented in a different data center 130 within the region 112. Thus, if one domain controller 140A goes offline or is otherwise made unavailable for any reason (e.g., due to a natural disaster striking the data center in which the domain controller physically resides), the other domain controller 140B will likely remain online and available to manage use of the directory 142A. Accordingly, the organization's users can continue to perform any computing tasks that require the authentication, authorization, and other services of the directory 142A.

The directory management system may also include one or more auto scaling controllers 150 to monitor directory-related events, operating conditions, and the like, and to implement automatic scaling of directories and directory management resources, as described in greater detail below. The components of directory management system, such as the domain controllers, the automatic scaling controllers, and the like can each be implemented as hardware, such as a server computing device, or as a combination of hardware and software. In addition, two or more components of the directory management system be combined on one server computing device or separated individually or into groups on several server computing devices. In some embodiments, the features and services provided by the directory management system may be implemented as web services consumable via a communication network. In further embodiments, the features and services are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

As will be appreciated, the various computing devices and components shown and described herein may communicate with each other and/or with other devices and components via one or more communication networks. The communication networks may be part of a publicly-accessible network of linked networks, possibly operated by various distinct parties, such as the Internet. In some embodiments, the communication networks may be or include a private network, personal area network, local area network, wide area network, cable network, satellite network, cellular telephone network, etc. or combination thereof.

Setup of Automatic and On-Demand Scaling

Figure 2:
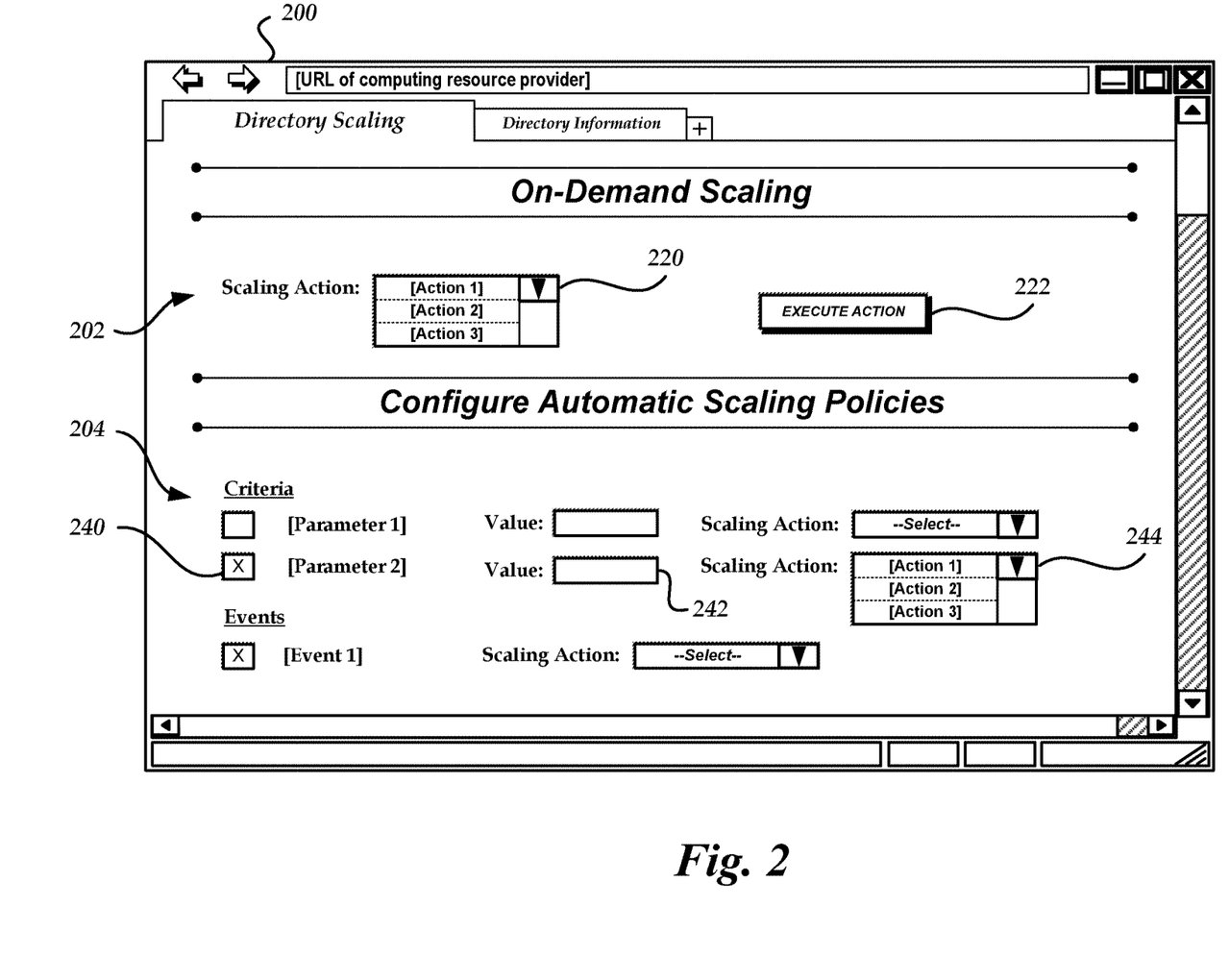
FIG. 2 is a diagram of a user interface for configuring automatic resizing of directories.

FIG. 2 shows an example user interface for setup of automatic and on-demand scaling policies for an organization's directory or directories. A system administrator or some other user associated with an organization, such organization 102A shown in FIG. 1, may access the directory management system to configure scaling of the organization's directory 142A. Illustratively, the directory management system may include or be associated with a content server that generates and transmits network-based content pages for managing directories and configuring automatic scaling. The content page 200 shown in FIG. 2 is an example of such a content page.

The interface may include separate panels, areas or portions for allowing organizations to configure on-demand scaling 202 and automatic scaling 204. For example, in the on-demand scaling 202 portion, a drop-down list 220 or some other interface control configured to present multiple selectable options may be provided to allow the user to select on-demand scaling actions. In some embodiments, the scaling actions that the applications may be authorized to perform include: migrating to a larger or smaller domain controller; adding or removing resources to/from an existing domain controller; adding/removing domain controllers in a particular zone or region; adding/removing regions for use with a particular directory; and the like. The user can than initiate performance of the scaling action by activating button 222 or performing some other action to submit the on-demand scaling request.

An automatic scaling policy configuration portion 204 may include a listing of operating parameters and events that may serve as the basis for automatic scaling of directory-management resources. Users may specify criteria pertaining to various operating parameters related to the directory, including but not limited to: central processing unit ("CPU")

utilization and/or capacity; memory utilization and/or capacity; the number of objects in the directory; the number of concurrent connections to the domain controller(s) for the directory; domain controller latency when responding to a directory-related request; cost incurred by the origination per object or per connection over a particular period of time; total cost incurred by the organization over a particular period of time; and the like. Users may also or alternatively specify particular events that serve to trigger automatic scaling actions. For example, users may wish to have some action automatically initiated when an existing domain controller for the organization's directory goes offline, when certain errors are raised, at certain times of the day or year (e.g., reduce resources at night, add resources during the "login storm" period at the beginning of the work day, or add resources during a busy season); and the like.

A user may select a particular operating parameter or event by, e.g., activating or de-activating a checkbox 240 or interacting with some other interface control configured to indicate selection or de-selection of an item. For operating parameters that the user has chosen, the user may enter some value in input field 242 for the parameter that triggers automatic scaling. The user may select a particular automatic scaling action (or group of actions) to perform when the corresponding criterion or event is satisfied. For example, if the operating parameter associated with selection of checkbox 240 corresponds to the number of objects in the directory falling below a threshold, the user may enter a value for the threshold, such as 10,000. Thereafter, if the automatic scaling controller 150 detects that the number of objects in this organization's directory falls below 10,000, the automatic scaling controller 150 may initiate the corresponding action selected by the user (e.g., down-scaling to a smaller and/or lower cost domain controller).

A drop-down list 244 or some other interface control configured to present multiple selectable options may be provided to allow the user to select automatic scaling actions for individual criteria and events. In some embodiments, the automatic scaling actions that the applications may be authorized to perform include: migrating to a larger or smaller domain controller; adding or removing resources to/from an existing domain controller; adding/removing domain controllers in a particular zone or region; adding/removing regions for use with a particular directory; and the like.

When a user configures an automatic scaling policy for an organization's directory, automatic scaling policy information may be stored such that the policy information is accessible to one or more automatic scaling controllers 150 of the directory management system. For example, the policy information may be stored in a data store in the data centers in which domain controllers have been or will be implemented for the organization's directory. Thus, the automatic scaling controllers 150 in those data centers may monitor the criteria and/or events, and may efficiently implement the appropriate automatic scaling actions. Domain controllers and/or automatic scaling controllers 150 in different data centers may communicate with each other and exchange information relevant to the determination of whether automatic scaling actions are to be implemented. In this way, an automatic scaling controller 150 in one data center may make an accurate determination regarding an automatic scaling policy based on information from all domain controllers using the organization's directory, even if some or all of the domain controllers are physically located in different data centers.

Triggering and Implementation of On-Demand and Automatic Scaling Actions

Figure 3:
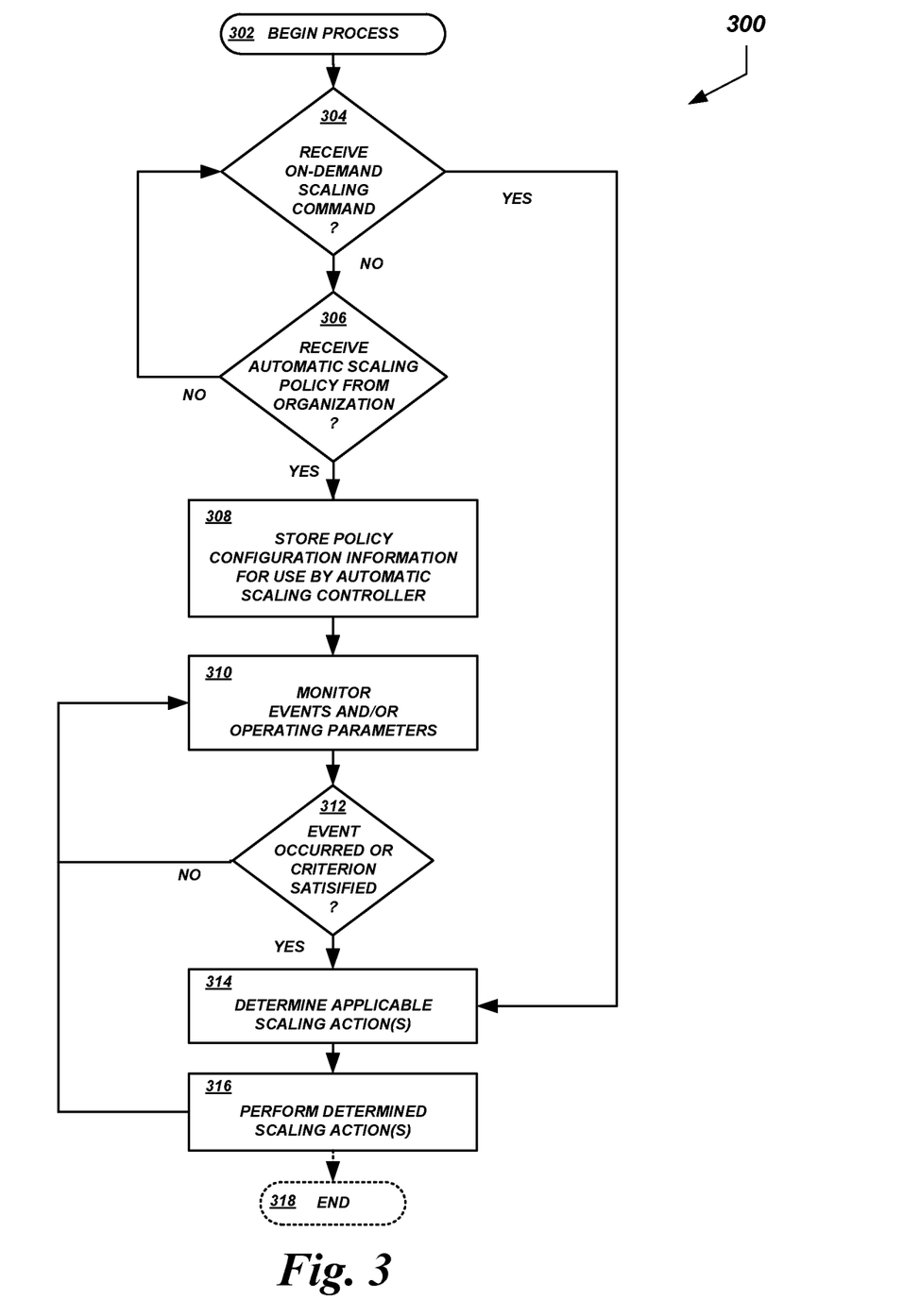
FIG. 3 is a flow diagram of an illustrative process for managing automatic resizing of directories.

FIG. 3 illustrates a sample process 300 that may be used by the directory management system to implement on-demand scaling actions. In addition, the process 300 may be used by an automatic scaling controller 150 or some other module or component of a directory management system to monitor changes in various operational parameters and other events, and implement automatic directory scaling actions according to organization-specified policies. Advantageously, the automatic scaling controller 150 may monitor operating parameters and events with respect to the directories of multiple, distinct organizations or other customers, and automatically implement scaling actions without requiring monitoring or other action on the part of the organizations themselves. In this way, the directory management system can provide a dynamic and robust directory management environment that scales directory management resources based on organization-specified policies regardless of where the directories and/or domain controllers are physically located, how big or small the directories are, the size the geographic area covered by individual directories, etc. Such a directory management system can provide organizations with desired cost control measures, and can also ensure that directory management resources are efficiently utilized.

The process 300 begins at block 302. For example, the process 300 may begin automatically upon initialization of an automatic scaling controller 150 in a data center of the directory management system.

At decision block 304, the directory management system may determine whether an on-demand scaling action has been requested or initiated by an organization. Illustratively, an administrator, technician, or other user associated with an organization may launch a browser application on a user computing device 102 and navigate to the content page 200, shown in FIG. 2, to select a directory scaling action to be performed. If so, the process 300 can proceed to block 314, where applicable scaling actions are determined and then performed at block 316. Otherwise, the process 300 can proceed to decision block 306.

At decision block 306, the directory management system may determine whether an automatic scaling policy has been created, selected, modified, or otherwise indicated for a particular directory or group of directories. Illustratively, an administrator, technician, or other user associated with an organization may launch a browser application on a user computing device 102 and navigate to the content page 200, shown in FIG. 2, to select or define one or more automatic scaling polices for the organization's directory. If so, the process 300 may proceed to block 308; otherwise the process 300 may return to decision block 304 to wait for receipt of a policy or on-demand request, proceed to block 310 to monitor events and/or operating parameters associated with previously-defined polices, or terminate at block 318.

At block 308, information regarding the policy created, selected, modified, or otherwise indicated for a particular directory or group of directories above at block 306 can be stored such that it is accessible to an automatic scaling controller 150. If an automatic scaling controller 150 has been implemented in each data center, then policy configuration information may be stored in a data store integrated with or accessible to the automatic scaling controller 150 in the data center in which a domain controller for the organization's directory is also located. In some embodiments, a single automatic scaling controller 150 may be used for multiple (e.g. two or more) or all data centers of the directory management system. In additional embodiments, multiple (e.g., two or more) automatic scaling controllers may be implemented in a single data center.

At block 310, an automatic scaling controller 150 can monitor the event(s) and/or operating parameter(s) associated with automatic scaling policies. As described above, a directory management system may implement a single automatic scaling controller 150 for all data centers, or one or more automatic scaling controllers 150 for each data center. In some embodiments, individual automatic scaling controllers 150 can monitor the events and/or operating parameters associated with policies that have been previously submitted by organizations having directories managed by domain controllers 140 in the same data center as the automatic scaling controller 150. For example, the automatic scaling controller 150 for a particular data center may communicate with each domain controller 140 in the data center. The automatic scaling controller 150 may receive periodic or continuous information regarding events and/or operating parameters associated with previously submitted policies (e.g., number of objects in a directory; number of concurrent connections to the domain controller 140; latency; etc.). In some cases, the automatic scaling controller 150 may perform computations or analyses using information from the domain controllers 140 in order to monitor events and/or operating parameters. For example, the automatic scaling controller 150 may perform calculations to determine the costs incurred in certain situations, such as the cost to an organization per directory object or per concurrent connection.

Figure 4:
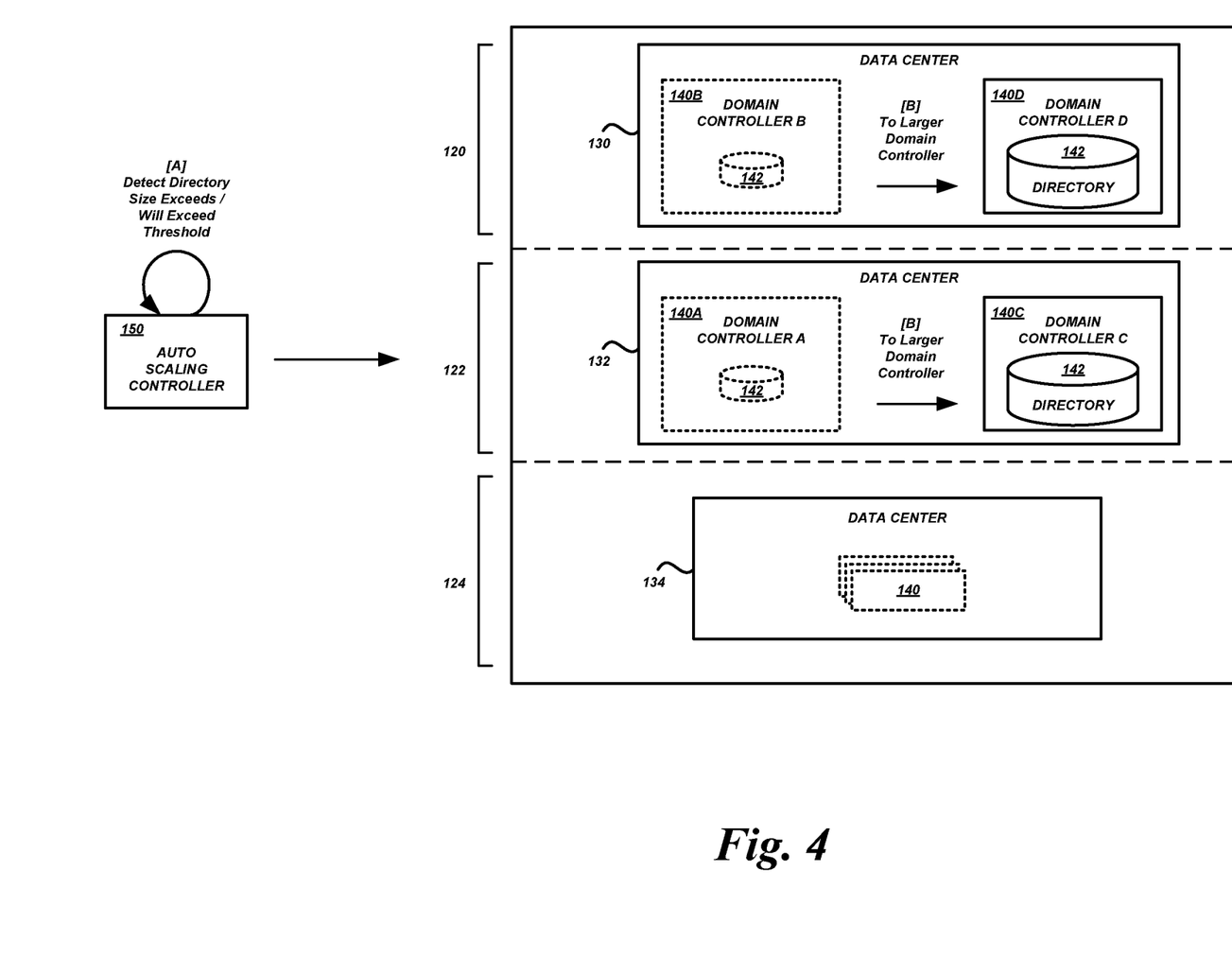
FIG. 4 is a block diagram of illustrative resized domain controllers in a directory management system.
Figure 5:
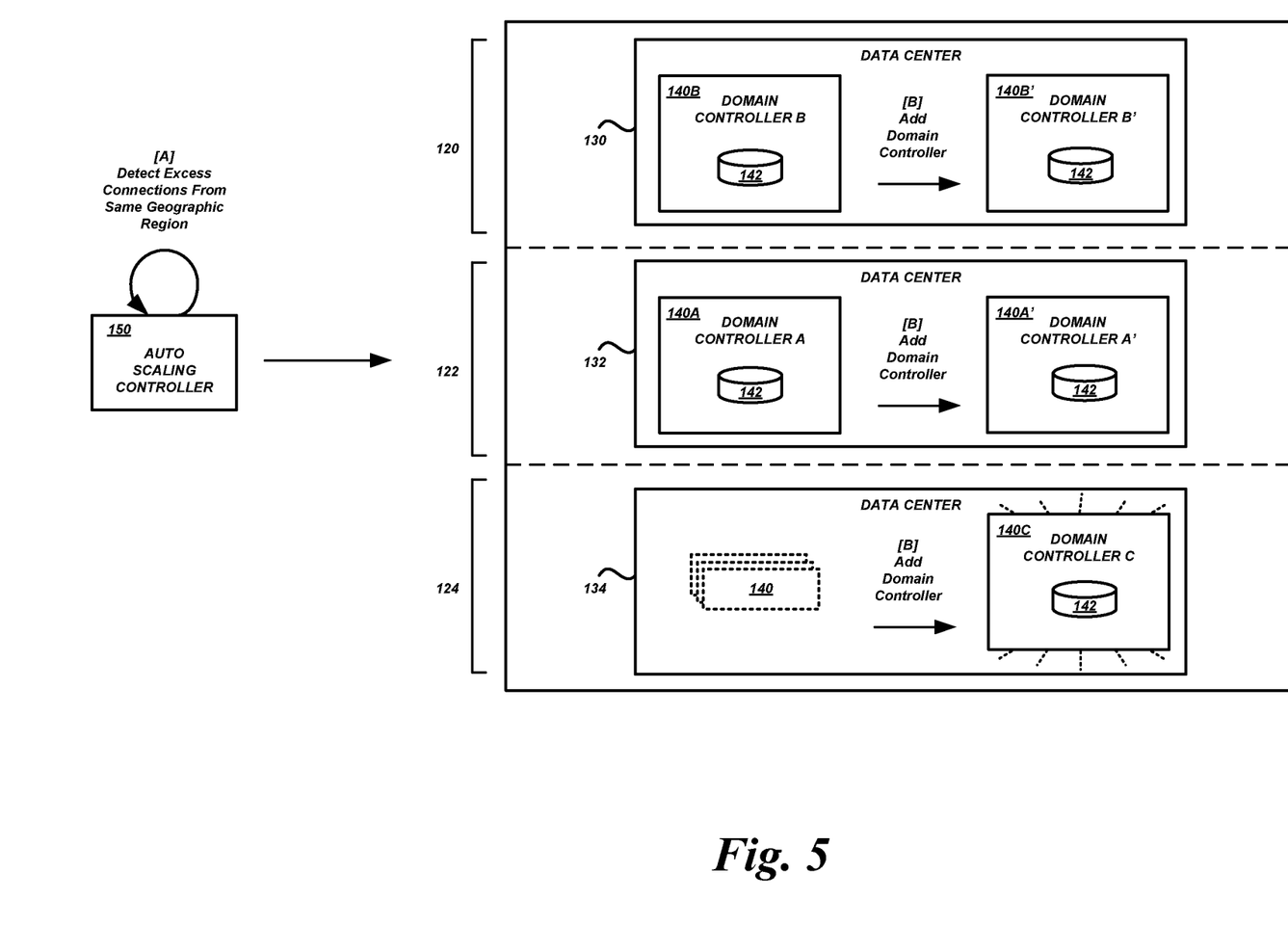
FIG. 5 is a block diagram of an illustrative addition of domain controllers in a directory management system.

At decision block 312, the automatic scaling controller 150 can determine whether, for any of the policies that the automatic scaling controller 150 is responsible for implementing, an event has occurred or a criterion has been satisfied. If such an event has occurred or a criterion has been satisfied, the process 300 may proceed to block 314 where the automatic scaling controller 150 can determine the applicable scaling actions (if any) to perform in response to occurrence of the event or satisfaction of the criterion. FIGS. 4 and 5 illustrate examples of event/criterion detection and performance of automatic scaling actions. Otherwise, if no event has occurred and no criterion has been satisfied, the process 300 may return to block 308.

FIG. 4 shows the implementation of replacement domain controllers configured to manage larger directories. The organization that owns or is otherwise associated with a directory 142 may have previously configured an automatic scaling policy (e.g., at block 306 of FIG. 3) specifying that when the number of objects in the organization's directory 142 exceeds a particular threshold, the directory management service is to migrate the directory 142 to domain controllers that have additional resources to effectively manage the larger directory 142. As shown, an automatic scaling controller 150 may determine at [A] (and block 312 of FIG. 3) that the size of the directory 142 exceeds the threshold, or will exceed the threshold if a requested operation is performed (e.g., an "add user" request is made to add a user to the directory 142). The automatic scaling controller 150 may then (e.g., at block 316 of FIG. 3) transfer management of the directory 142 from a particular domain controller 140A (or combination of domain controllers 140A and 140B) to a domain controller 140C (or combination of domain controllers 140C and 140D) with additional resources to more effectively manage larger directories. Illustratively, the directory management system may offer domain controllers in various sizes or capacities, such as small domain controllers optimized for directories with a small number of objects (e.g., about 1,000 objects), medium domain controllers optimized for directories with a moderate number of objects (e.g., about 10,000 objects), and large domain controllers for directories with a large number of objects (e.g., about 100,000 objects). The various sizes may correspond to virtual machine abstractions of the actual hardware computing devices in the data centers of the directory management system. Management of directories may be transferred to domain controllers of the next bigger size (or next smaller size), and such transfer may involve the physical transfer of directory management to another device or group of devices, or the logical transfer of directory management to another virtual machine. Such scaling may be referred to as vertical scaling. In some embodiments, the directory management system may add resources to (or remove resources from) existing domain controllers in order to implement a scaling policy, rather than moving management of a directory to another physical or virtual machine. Alternatively, the organization may have submitted an on-demand scaling request (e.g., at block 304 of FIG. 3) to up-scale or down-scale one or more domain controllers.

FIG. 5 shows the implementation of additional domain controllers to improve availability of a directory, rather than to increase the size of the directory. Such scaling may be referred to as horizontal scaling. The organization that owns or is otherwise associated with a directory 142 may have previously configured an automatic scaling policy (e.g., at block 306 of FIG. 3) specifying that when the number of connections to domain controllers for a particular directory meets or exceeds a threshold, the directory management service is to add a domain controller in the same zone/data center as the domain controller(s) currently using the directory 142 in order to accommodate the connections and improve overall availability of the directory 142. As shown, an automatic scaling controller 150 may determine at [A] (and block 312 of FIG. 3) that the number of connections exceeds the threshold. The automatic scaling controller 150 may then at [B] (and block 316 of FIG. 3) automatically implement additional domain controllers 140A' and 104B' in the same zones or data centers as the domain controllers 104A and 104B, respectively. In some embodiments, the scaling controller 150 may implement a new domain controller 140C in a different data center or zone altogether. Alternatively, the organization may have submitted an on-demand scaling request (e.g., at block 304 of FIG. 3) to implement one or more additional domain controllers.

Figure 6:
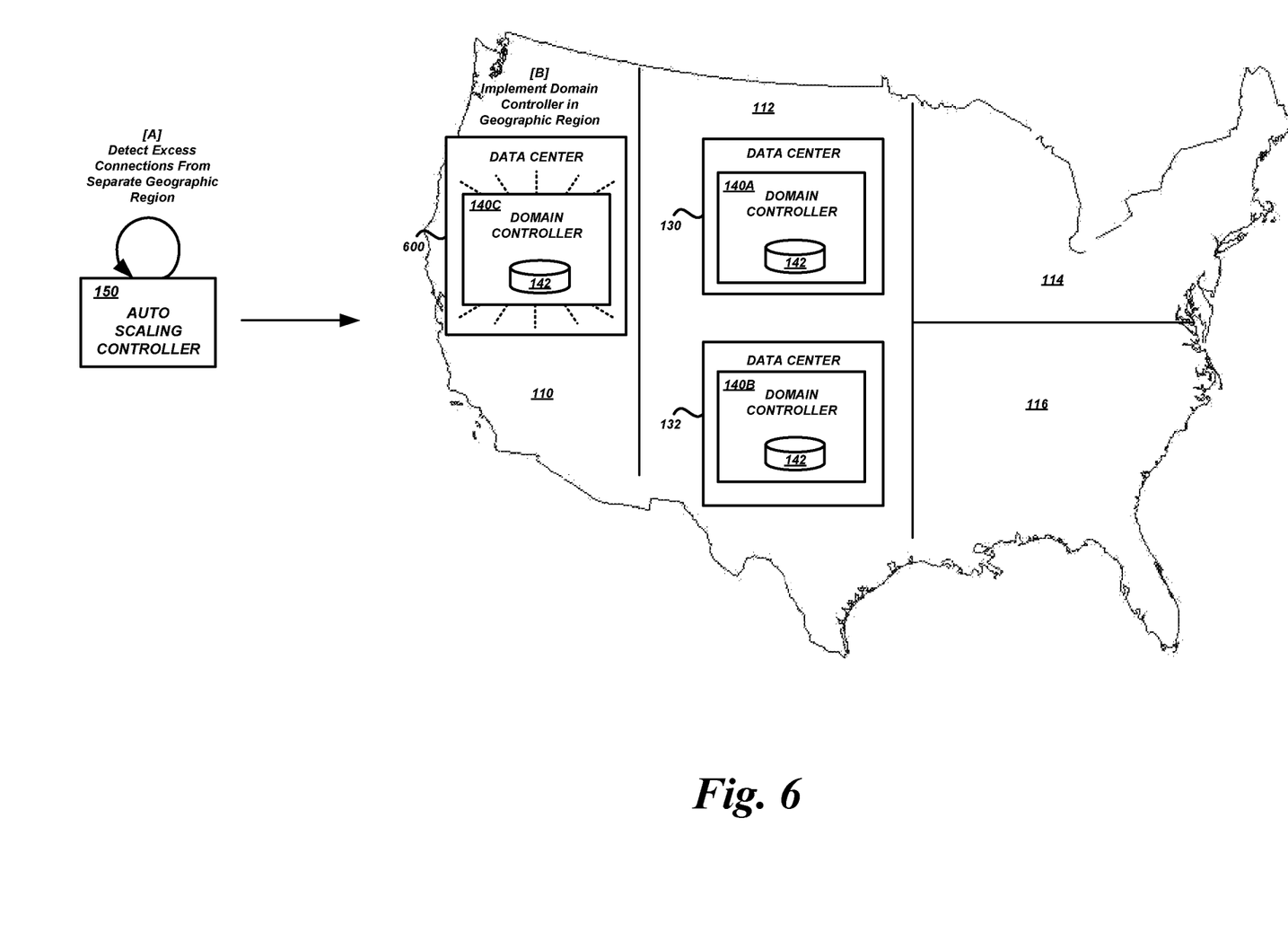
FIG. 6 is a block diagram of another illustrative addition of domain controllers in a directory management system.

FIG. 6 shows another example of the implementation of additional domain controllers to improve availability of a directory, rather than to increase the size of the directory. The horizontal scaling shown in FIG. 6 expands the availability of the directory to a different region altogether, rather than improving availability within an existing region. For example, the organization that owns or is otherwise associated with a directory 142 may have previously configured an automatic scaling policy (e.g., at block 306 of FIG. 3) specifying that when the number of connections from a geographic region in which there is not currently a domain controller for the directory 142 exceeds a particular threshold, the directory management service is to add a domain controller in the geographic region to accommodate the connections and improve overall availability of the directory 142. As shown, an automatic scaling controller 150 may determine at [A] (and block 312 of FIG. 3) that the number of connections from geographic region 110 exceeds the threshold. The automatic scaling controller 150 may then at [B] (and block 316 of FIG. 3) automatically implement an additional domain controller 140C in a data center 600 of the geographic region 110 to more effectively handle the connections from the region 110. Alternatively, the organization may have submitted an on-demand scaling request (e.g., at block 304 of FIG. 3) to implement one or more additional domain controllers in additional regions.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the process 300 described with respect to FIG. 3 may be embodied in a set of executable program instructions stored on one or more non-transitory computer-readable media, such as one or more disk drives or solid-state memory devices, of a computing system with which the directory management system is associated. When the process 300 is initiated, the executable program instructions can be loaded into memory, such as RAM, and executed by one or more processors of the computing system. In some embodiments, the computing system may include multiple computing devices, such as servers, and the process or portions thereof may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A directory management system comprising:
    a pool of domain controller computing devices, wherein the pool of domain controller computing devices is configured to manage network directories of a plurality of different organizations, wherein a network directory of an organization of the plurality of different organizations comprises a directory of objects associated with a network of the organization, and wherein the directory management system communicates with computing devices of the organization via a different network than the network of the organization; and
    a scaling controller comprising a non-transitory memory and one or more physical computing devices configured to execute computer-executable instructions stored in the non-transitory memory to at least:
        provide a network-accessible user interface that enables each of the plurality of organizations to specify, for the respective organization, a scaling policy for performing automatic scaling actions, such that different organizations can have different scaling policies;
        receive, from a computing device of the organization via the user interface, directory scaling policy data comprising, for a monitored operating parameter of the network directory, a threshold for determining whether to migrate management of the network directory from a current domain controller computing device to an alternate domain controller computing device comprising a greater quantity of computing resources than the current domain controller computing device, said alternate domain controller computing device configured to manage a larger network directory than the current domain controller computing device;
        determine, based on monitoring the operating parameter of the network directory, that the threshold is satisfied; and
        in response to determining that the threshold is satisfied, migrate management of the network directory from the current domain controller computing device to the alternate domain controller computing device.

2. The directory management system of claim 1, wherein the migration of management to the alternate domain controller computing device is performed without requiring an instruction to be received from the organization subsequent to receiving the directory scaling policy data.

3. The directory management system of claim 1, wherein the threshold is a threshold size of the network directory.

4. The directory management system of claim 1, wherein the threshold is a threshold number of connections to the network directory.

5. The directory management system of claim 1, wherein at least a portion of the objects associated with the network of the organization represent individual resources of a plurality of resources of the network of the organization, and wherein the plurality of resources of the network of the organization comprises at least one of: a computing device, an application, or a user account.

6. The directory management system of claim 1, wherein the current and alternate domain controller computing devices are configured to at least respond to authentication requests using the network directory.

7. The directory management system of claim 1, wherein the operating parameter comprises one of: a number of objects in the network directory or a number of network connections associated with the network directory.

8. The directory management system of claim 1, wherein the user interface includes a field for specifying a parameter value, and includes a control for selecting, from a plurality of scaling actions, a scaling action to automatically be performed in response to the parameter value being satisfied.

9. A computer-implemented method comprising:
    as implemented by a directory management system comprising a pool of domain controller computing devices, wherein some domain controller computing devices in the pool have different quantities of computing resources than other domain controller computing devices in the pool:
        assigning a first domain controller computing device of the pool of domain controller computing devices to manage a network directory of an organization, wherein the pool of domain controller computing devices is configured to manage network directories of a plurality of different organizations, wherein the network directory comprises a directory of objects associated with a network of the organization, and wherein the directory management system communicates with computing devices of the organization via a different network than the network of the organization;
        providing a network-accessible user interface that enables the plurality of organizations to specify, for their respective organization, a scaling policy for performing automatic scaling actions, such that different organizations can have different scaling policies;
        receiving directory scaling policy data for the organization via the network-accessible user interface, the scaling policy data specifying, for an operating parameter of the network directory, a threshold for determining whether to migrate management of the network directory;
        determining, based on monitoring the operating parameter of the network directory, that the threshold is satisfied; and
        in response to the threshold being satisfied, migrating management of the network directory from the first domain controller computing device to a second domain controller computing device that has a greater quantity of computing resources than the first domain controller computing device, said second domain controller computing device configured to manage a larger network directory than the first domain controller computing device.

10. The computer-implemented method of claim 9, further comprising responding, by the first and second domain controller computing devices, to authentication requests from computing devices of the organization, wherein the first and second domain controller computing devices use the network directory to respond to the authentication requests.

11. The computer-implemented method of claim 9, wherein determining that the threshold is satisfied comprises determining that a number of objects in the network directory satisfies the threshold, wherein at least a subset of objects in the network directory represent computing devices connected to the network.

12. The computer-implemented method of claim 9, wherein determining that the threshold is satisfied comprises determining that a number of objects in the network directory satisfies the threshold, wherein at least a subset of objects in the network directory represent users of the network.

13. The computer-implemented method of claim 9, wherein determining that the threshold is satisfied comprises determining that a number of connections to the network directory satisfies the threshold.

14. The computer-implemented method of claim 9, wherein the migration of management to the second domain controller computing device is performed without requiring an instruction to be received from the organization subsequent to receiving the directory scaling policy data.

* * * * *